(12) United States Patent
Caprioli et al.

(10) Patent No.: US 7,647,477 B2
(45) Date of Patent: Jan. 12, 2010

(54) BRANCH TARGET AWARE INSTRUCTION PREFETCHING TECHNIQUE

(75) Inventors: Paul Caprioli, Mountain View, CA (US); Shailender Chaudhry, San Francisco, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 434 days.

(21) Appl. No.: 10/996,027

(22) Filed: Nov. 23, 2004

(65) Prior Publication Data

US 2005/0257034 A1 Nov. 17, 2005

Related U.S. Application Data

(60) Provisional application No. 60/569,956, filed on May 11, 2004.

(51) Int. Cl.
*G06F 15/00* (2006.01)
(52) U.S. Cl. .................................................. 712/207
(58) Field of Classification Search .................. 712/207
See application file for complete search history.

(56) References Cited

U.S. PATENT DOCUMENTS

| 6,272,624 | B1 | 8/2001 | Giacalone et al. | |
|---|---|---|---|---|
| 6,289,441 | B1 | 9/2001 | Talcott et al. | |
| 6,658,534 | B1* | 12/2003 | White et al. | 711/137 |
| 2004/0210749 | A1* | 10/2004 | Biles | 712/240 |

FOREIGN PATENT DOCUMENTS

| EP | 0 729 095 | 8/1996 |
|---|---|---|
| WO | WO 96/39657 | 12/1996 |

OTHER PUBLICATIONS

International Search Report issued in corresponding PCT Application No. PCT/US2005/018972, mailed Jun. 30, 2006.

Yeh, Tse-Yu et al., "Increasing the Instruction Fetch Rate via Multiple Branch Prediction and a Branch Address Cache," Proceedings of the 7th International Conference on Supercomputing, ACM Press New York, NY, 1993, pp. 67-76.

Lee, Jong-bok, et al., "An Enhanced two-level Adaptive Multiple Branch Prediction for Superscalar Processors," Journal of Systems Architecture, Elsevier Science Publishers BV., Amsterdam, NL, vol. 45, No. 8, Feb. 1999, pp. 591-602.

Chang, Po-Yung et al., "Alternative Implementations of Hybrid Branch Predictors," Proceedings of the 28th annual international symposium on Microarchitecture, IEEE Computer Society Press, Los Alamitos, CA, 1995, pp. 252-257.

(Continued)

*Primary Examiner*—Eddie P Chan
*Assistant Examiner*—John Lindlof
(74) *Attorney, Agent, or Firm*—Gunnison, McKay & Hodgson, L.L.P.; Forrest Gunnison

(57) ABSTRACT

Inspecting a currently fetched instruction group and determining branching behavior of the currently fetched instruction group, allows for intelligent instruction prefetching. A currently fetched instruction group is predecoded and, assuming the currently fetch instruction group includes a branch type instruction, a branch target is characterized in relation to a fetch boundary, which delimits a memory region contiguous with the memory region that hosts the currently fetched instruction group. Instruction prefetching is included based, at least in part, on the predecoded characterization of the branch target.

16 Claims, 7 Drawing Sheets

OTHER PUBLICATIONS

Evers, Marius et al., "Using Hybrid Branch Predictors to Improve Branch Prediction Accuracy in the Presence of Context Switches," Proceedings of the 23rd annual international symposium on Computer architecture, ACM Press New York, NY, 1996, pp. 3-11.

Hammond, Lance, et al., "A Single Chip Multiprocessor," Theme Feature, IEEE, Sep. 1997, pp. 79-85.

McFarling, Scott, "Combining Branch Predictors," WRL Technical Note TN-36, Digital Western Research Laboratory, Palo Alto, CA, Jun. 1993, 25 pages.

Yeh, Tse-Yu & Patt, Yale N. "Alternative Implementations of Two-Level Adaptive Branch Prediction," Proceedings of the 19th annual international symposium on Computer architecture, ACM Press New York, NY, 1992, pp. 124-134.

Yeh, Tse-Yu & Patt, "A Comparison of Dynamic Branch Predictors that use Two Levels of Branch History," Proceedings of the 20th annual international symposium on Computer architecture, ACM Press New York, NY, 1993, pp. 257-266.

* cited by examiner

BRANCH TARGET AWARE INSTRUCTION PREFETCHING TECHNIQUE

BACKGROUND

1. Field of the Invention

The present invention relates to the field of computers. More specifically, the present invention relates to computer architecture.

2. Description of the Related Art

Instructions are generally stored in a memory hierarchy that includes an instruction cache to help satisfy instruction bandwidth requirements of modern high-performance processors. To execute the instructions, processors typically fetch a line of the instruction cache. Each cache line includes a group of instructions. If the execution path of a sequence of instructions is linear, a sequential set of cache lines will supply the processor with appropriate instructions for execution. However, if a branch type instruction is encountered, the execution path may diverge and require the processor to fetch instructions corresponding to a non-sequential cache line. Hence, the cache line of instructions to fetch next is not precisely known until execution trajectory from the current fetch group of instructions is known.

Advanced high-performance microprocessors often prefetch cache lines in an attempt to improve the likelihood that a later needed instruction can be fetched from cache. In general, prefetch is performed without precise information regarding execution trajectory and, as pipeline depths increase and/or speculative execution increases, prefetch can consume substantial memory bandwidth. Fetching of sequential cache lines comports with at least one potential execution path, which is linear. However, the occurrence of a branch type instruction introduces the possibility that instructions of the next cache line are not within an application's execution path. Accordingly, processors may forgo or cancel prefetching of a next cache line of instructions if a presumed execution path through instructions of a preceding cache line includes a branch type instruction, particularly if such a branch is predicted taken. Typically, forbearance or cancellation is designed to avoid the squandering of memory bandwidth. Unfortunately, the occurrence of a branch type instruction, even a predicted-taken branch, is not necessarily determinative that instructions within the next cache line, or even subsequent instructions of the preceding cache line, are not within an application's execution path.

Forgoing or canceling a prefetch of the next cache line would be undesirable if the next cache line were, in fact, in the execution path. However, extraneous prefetching inevitably consumes precious memory bandwidth. Accordingly, techniques are desired that efficiently characterize branch targets and intelligently prefetch instructions based on the characterization.

SUMMARY

It has been discovered that, by utilizing information about branch target locations, a processor may make intelligent decisions regarding prefetching of cache lines corresponding to an instruction sequence. Cache lines can be intelligently prefetched by exploiting information characterizing branch target locations of branch instructions appearing in a preceding cache line. Branch target locations are characterized with respect to instruction fetch group boundaries and, in some realizations, characterization may occur as part of predecode. For example, branch target locations may be characterized as "in the same cache line," "in the next cache line," or other. If it is determined that a to-be prefetched cache line is inconsistent with an execution path suggested by a predicted-taken branch of a preceding cache line (e.g. if the target of a branch instruction is not in the same or next cache line), then the prefetch may be undesirable, and, in some realizations of the present invention is cancelled. However, if the target of a predicted taken branch is in the same or next cache line, prefetching may proceed despite the existence of the predicted taken branch.

These and other aspects of the described invention will be better described with reference to the Description of the Drawing(s) and accompanying Figures.

BRIEF DESCRIPTION OF THE DRAWING(S)

The present invention may be better understood, and its numerous objects, features, and advantages made apparent to those skilled in the art by referencing the accompanying drawings.

FIGS. 1A-1C depict exemplary regulation of instruction prefetching based on branching information. FIG. 1A depicts an exemplary instruction store unit that allows instruction prefetching subsequent to an instruction group that includes a branching instruction. FIG. 1B depicts the exemplary instruction store unit canceling an instruction prefetch. FIG. 1C depicts the exemplary instruction store allowing instruction prefetching and utilizing prediction information.

The use of the same reference symbols in different drawings indicates similar or identical items.

DESCRIPTION OF THE DRAWING(S)

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

The following description refers to instruction fetch groups and instruction fetch group boundaries. An instruction fetch group boundary refers to the limit of an instruction fetch group. An instruction fetch group boundary may be in terms of memory size, number of instructions, etc. An instruction fetch group refers to a group of instructions fetched by a fetch unit, such as a contiguous group of instructions fetched from a memory unit (e.g., an instruction cache). For example, assume a line of an instruction cache hosts six instructions and a fetch unit can fetch a single line from the instruction cache in a single operation, then the instruction fetch group would be the six instructions within the group or the size of the cache line.

Figure 1A:
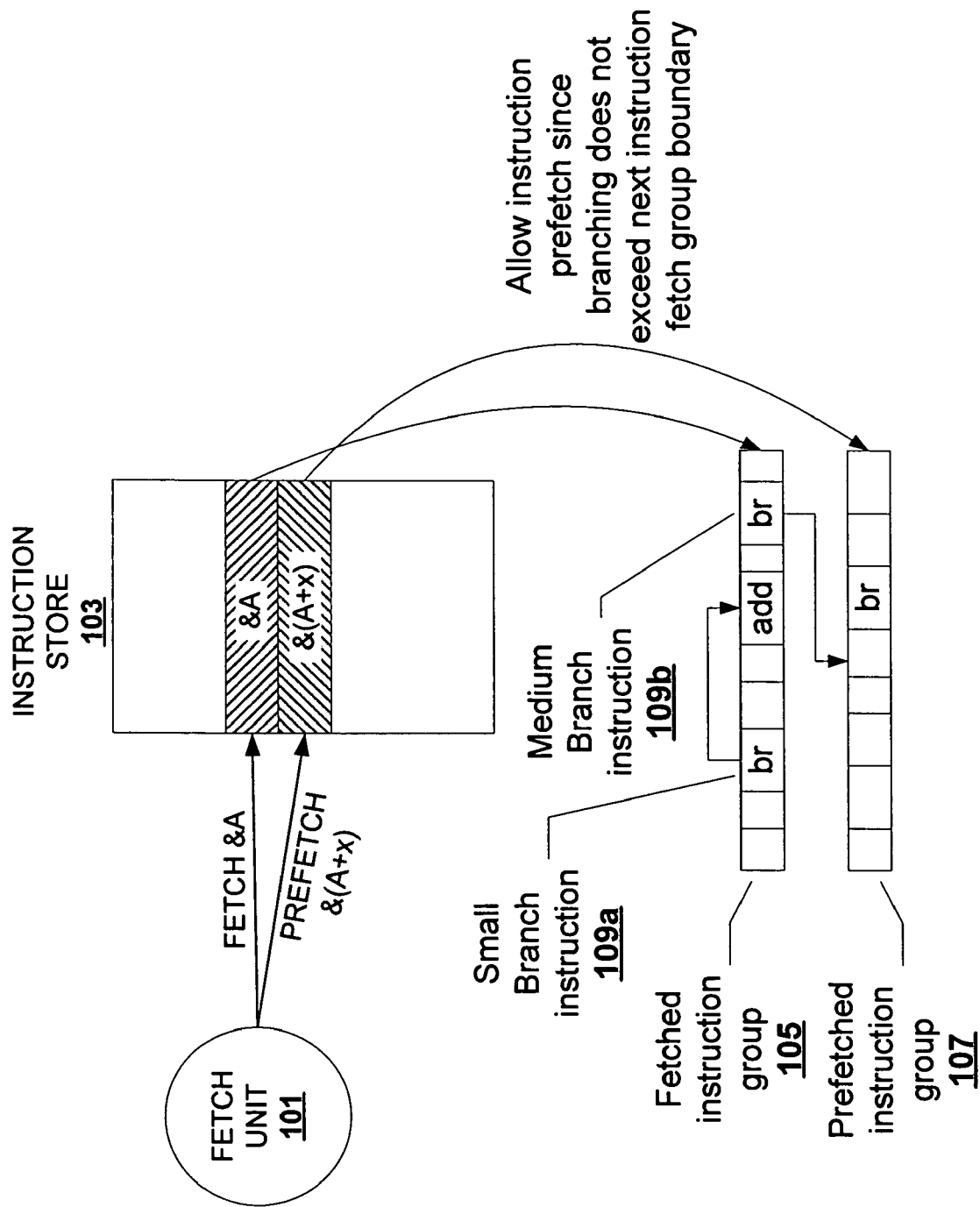
Figure 1B:
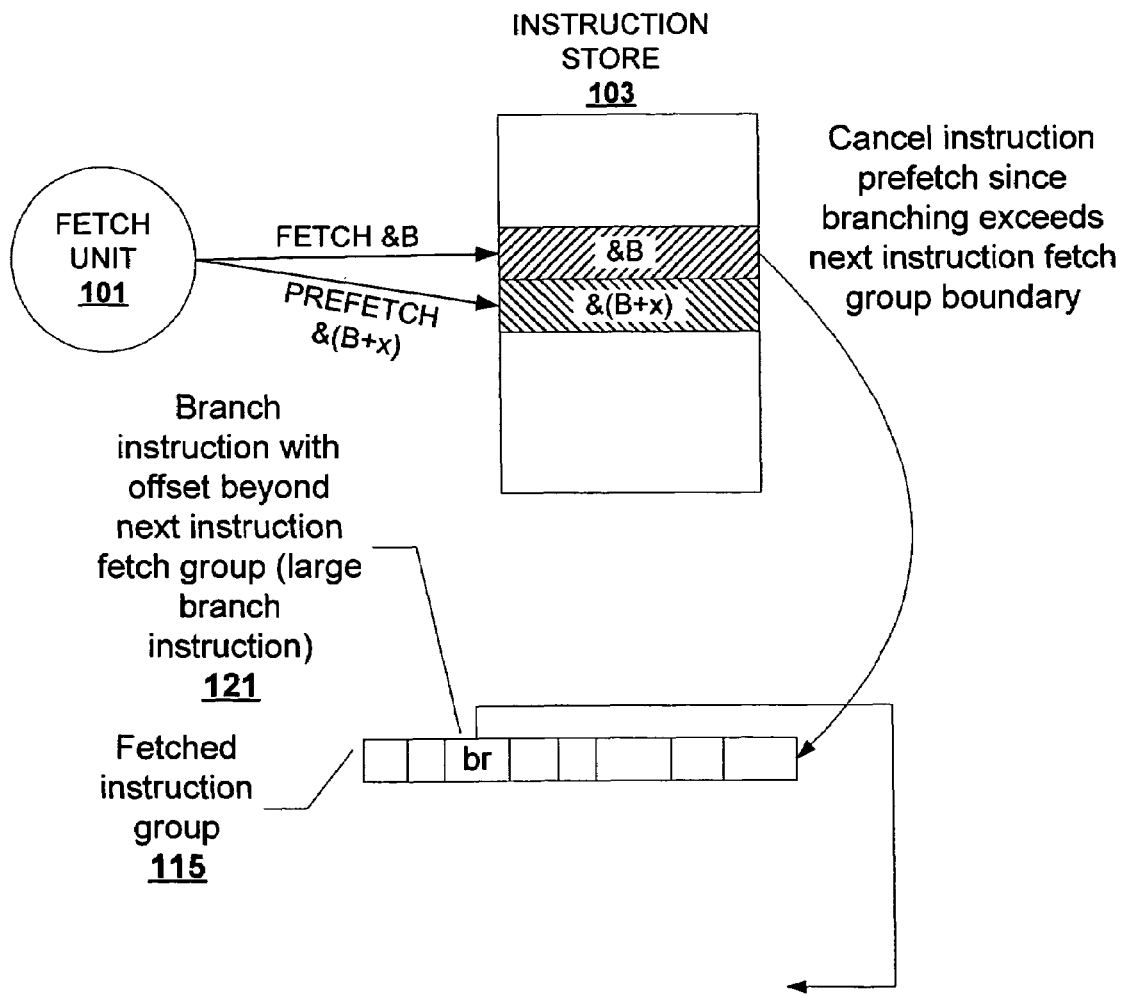
Figure 1C:
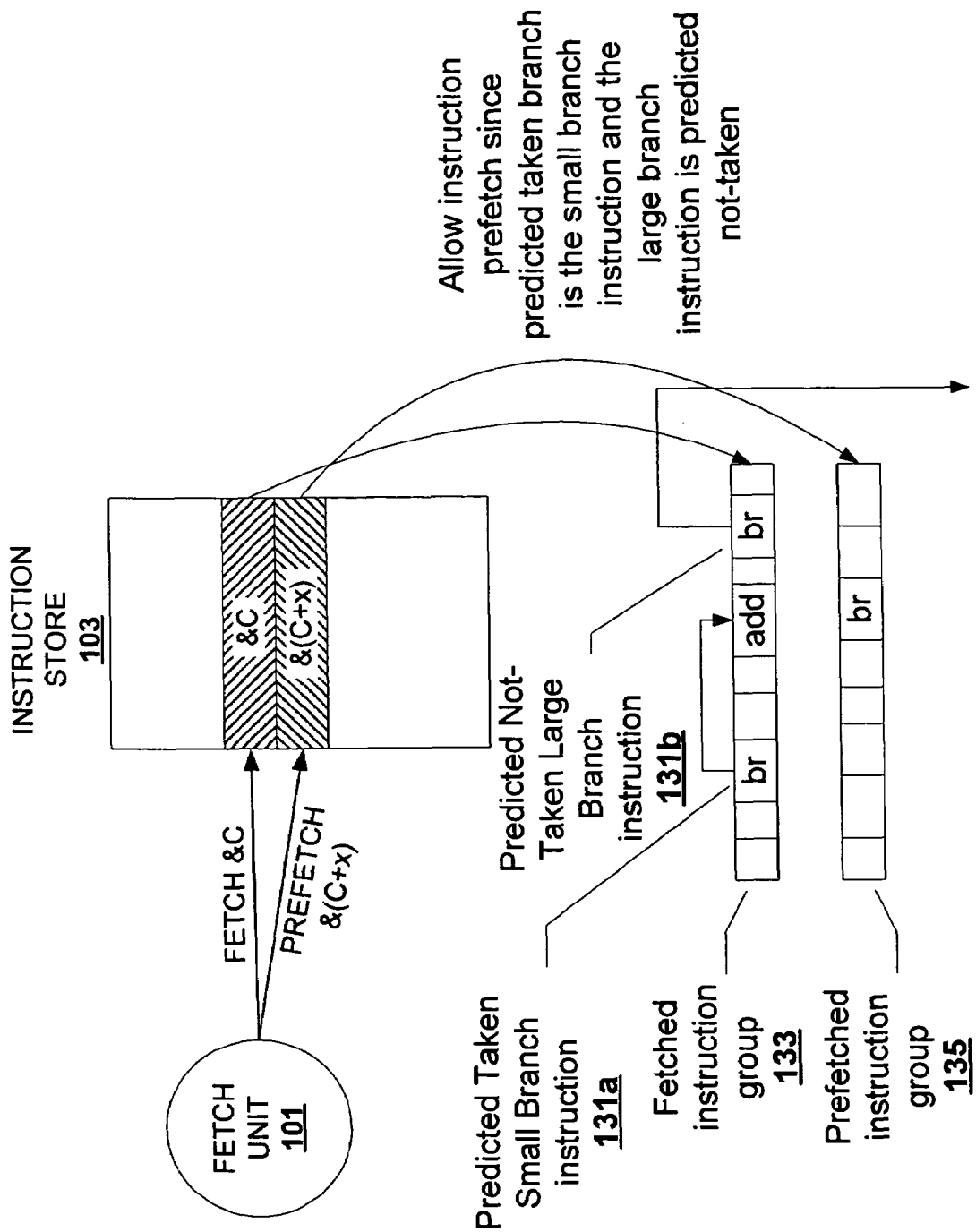

FIGS. 1A-1C depict exemplary regulation of instruction prefetching based on branching information. FIG. 1A depicts an exemplary instruction store unit that allows instruction prefetching subsequent to an instruction group that includes a branching instruction. In FIG. 1A, an instruction store 103 (e.g., a physically indexed, physically tagged cache) includes a first group of instructions at an address A and a second group of instructions at an address A+x, x being the size of a group of instructions within a fetch boundary. For example, if the fetch unit 101 fetches 64 B of instructions at a time from the instruction store 103, then x=64 B. A fetch unit 101 fetches the first group of instructions from the instruction store 103, and prefetches the second group of instructions from the instruction store 103. The fetched instruction group 105 includes branch instructions 109a-109b. The branch instruction 109a branches to a target within the first instruction fetch group 105 (a branch instruction that branches to a target within its own instruction group is referred to as a small branch instruction). The branch instruction 109b branches to a target within the next instruction fetch group (a branch instruction that branches to a target within the next instruction fetch group is referred to as a medium branch instruction), the prefetched instruction group 107. Since the branch instructions 109a and 109b do not go beyond the second instruction fetch group 107, the instruction fetch group 107 remains within the execution path.

FIG. 1B depicts the exemplary instruction store unit canceling an instruction prefetch. The instruction store 103 hosts an instruction fetch group at &B and an instruction fetch group at &(B+x). The fetch unit 101 fetches the first instruction fetch group at &B and prefetches the instruction fetch group at &(B+x). The first instruction fetch group 115 at &B includes a branch instruction 121. The branch instruction 121 has an offset that goes beyond the next instruction group. Since the target of the branch instruction 121 exceeds the next fetch group boundary (a branch instruction that branches to a target beyond the next instruction group is referred to as a large branch instruction), then the prefetch of the instruction fetch group 107 at &(B+x) is canceled.

FIG. 1C depicts the exemplary instruction store allowing instruction prefetching and utilizing prediction information. The instruction store 103 hosts an instruction fetch group at &C and an instruction fetch group at &(C+x). The fetch unit 101 fetches the first instruction fetch group 133 at &C and prefetches the instruction fetch group 135 at &(C+x). The first instruction fetch group 133 at &C includes a predicted taken small branch instruction 131a. The predicted taken small branch instruction 131a has a branch target that is within the same instruction fetch group. The instruction group 133 also includes a predicted not-taken large branch instruction 131b. The large branch instruction 131b branches beyond the next instruction group. Since the small branch instruction 131a is predicted as taken, and the large branch instruction 131b is predicted as not-taken, then the prefetch of instruction group 135 is allowed. Despite the occurrence of the large branch instruction 131b, sequential instruction prefetch proceeds because the large branch instruction 131b is predicted as not taken. If the large branch instruction 131b has been predicted as taken, then the prefetch of the next instruction would be cancelled.

Intelligent control of instruction prefetching can be influenced with branch prediction qualifier information in various realizations of the invention. For example, although the branch instruction 131b branches to a target beyond the next instruction fetch group, branch prediction information may indicate that this branch is "weakly taken." Since the branch of the large branch instruction 121 is "weakly taken", prefetching of the next instruction group may be allowed despite the taken prediction, thus influencing the prefetching decision with qualifier information.

Figure 2:
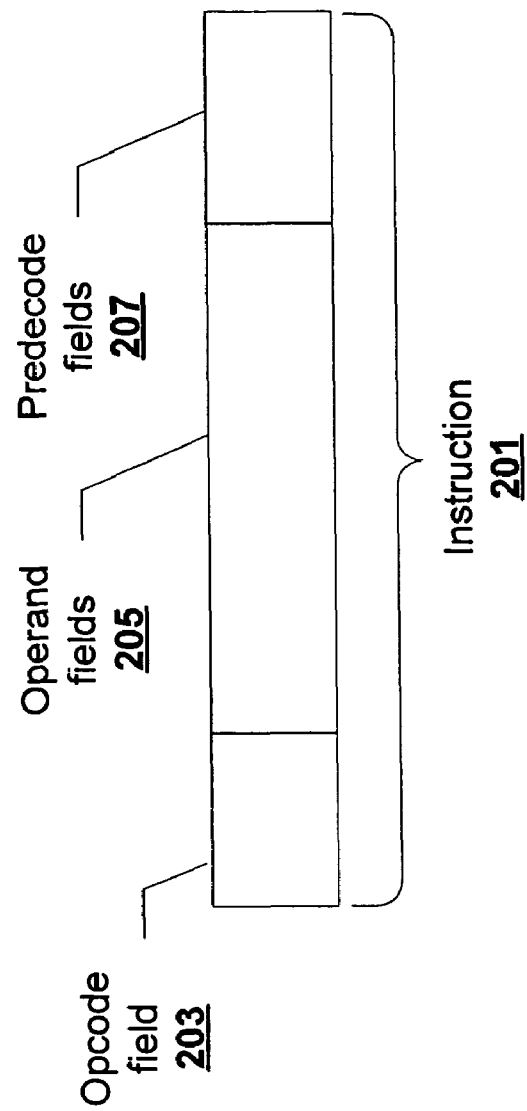
FIG. 2 depicts an exemplary instruction with predecode information.

Branch target location information can be embedded within each instruction, external from each instruction, etc. For example, branch target location information, and possibly branch prediction information, can be supplied in predecode information. FIG. 2 depicts an exemplary instruction with predecode information. An exemplary instruction 201 includes an opcode field 203, operand fields 205, and predecode fields 207. The opcode field 203 indicates the type of instruction. The operand fields 205 indicate data sources, data destinations, immediate data, branch targets, etc. The predecode fields 207 indicate various predecode information useful in expediting processing of an instruction. The predecode fields 207 include information that indicates whether the corresponding branch instruction branches to a target location within the same instruction fetch group, the next instruction fetch group, etc.

Whether the branch target location information is embedded within an instruction or external to an instruction, the instruction is inspected to generate their predecode information. Instruction inspection is coincident with installation into the instruction store in order to determine the branch target location information. Branch target location information can be determined before an instruction is installed into the instruction store, after an instruction is installed into the instruction store, etc. The instruction is inspected to determine the type of instruction. If the instruction is a branch instruction, then the target location of the branching instruction is determined with respect to the branch instruction's fetch group boundary (i.e., whether the branch target location is within the same fetch group, in the next fetch group, or beyond). Various techniques may be implemented to indicate the branching target location with respect to instruction fetch group boundaries. For example, the branching instructions may be categorized or characterized. In an exemplary implementation, branch instructions are characterized as follows: branch instructions characterized as a small branch are those branch instructions with a branching target within the same instruction fetch group; branch instructions characterized as a medium branch are those branch instructions with a branching target in the next instruction fetch group; and large branch instructions are those branching instructions with a branching target beyond the next instruction fetch group. Various realizations of the invention include fewer characterizations or additional characterizations. For example, branching instructions characterized as small through medium branches branch within the same page, while an extra large branching characterization is provided for those branching instructions with branch targets in a different page.

Figure 3:
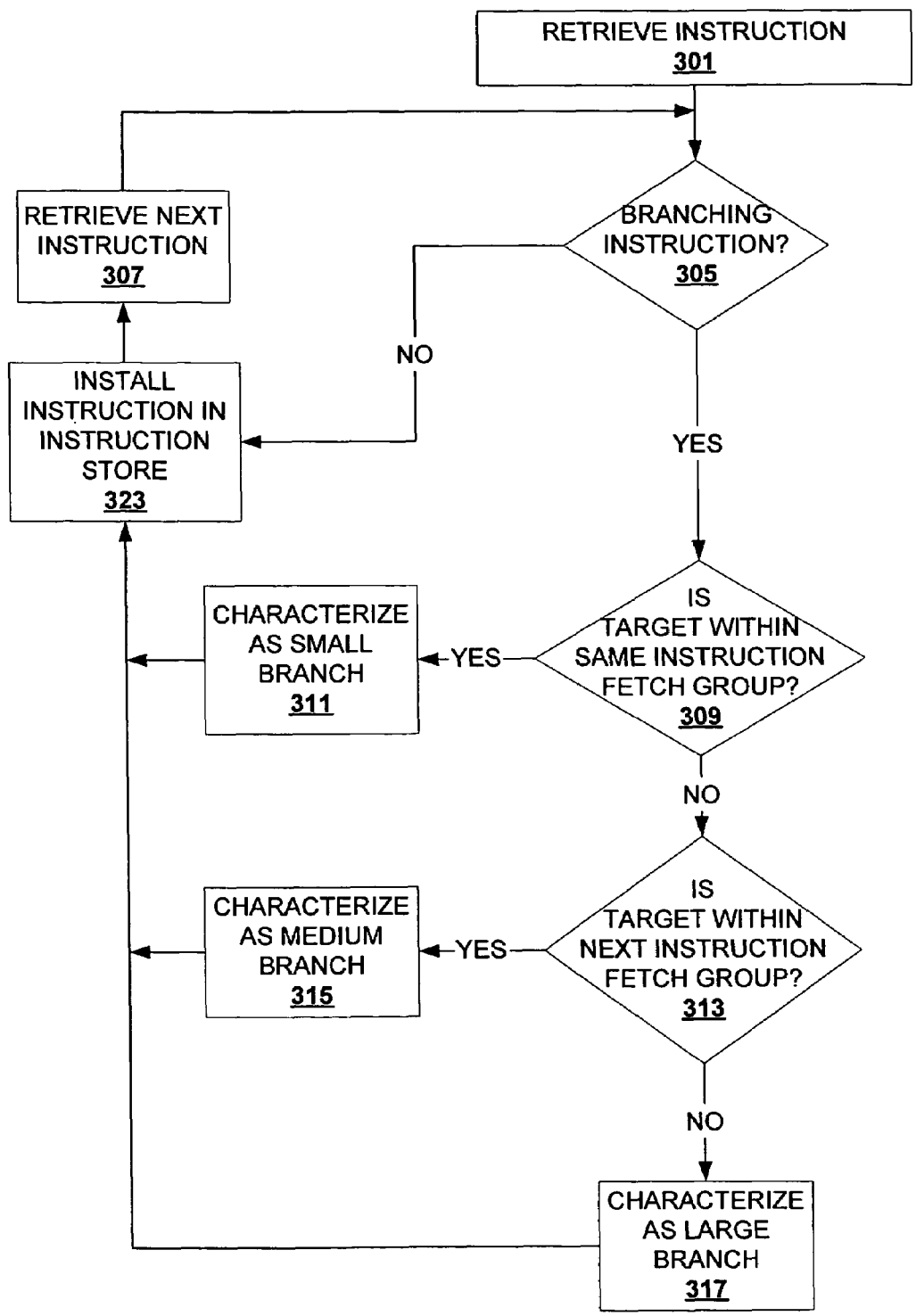
FIG. 3 depicts an exemplary flowchart for inspecting and categorizing branch instructions.

FIG. 3 depicts an exemplary flowchart for inspecting and categorizing branch instructions. At block 301, an instruction is retrieved. For example, an instruction is retrieved from L2 cache. At block, 305, it is determined if the installed instruction is a branching instruction. If the installed instruction is a branching instruction, then control flows to block 309. If the instruction is not a branching instruction, then control flows to block 323.

At block 307, the next instruction is retrieved. Control flows from block 307 back to block 305.

At block 309, it is determined if the branch target is within the same instruction fetch group. For example, the branch instruction address (e.g., program counter) is added to the offset of the branch instruction to determine if the target is within the same instruction fetch group. In another example, the position of the branch instruction within its instruction fetch group and the offset are utilized to determine if the target is within the same instruction fetch group. For instance, if the branch instruction is the second instruction within an instruction fetch group, then the target is within the same instruction fetch group if the sum of the offset and the position does not exceed the instruction fetch group boundary or size. Assume the branching instruction holds the second instruction position in the instruction fetch group and the instruction fetch group boundary is six, then the target is within the same instruction fetch group if the offset is less than or equal to 4. In another example, the instruction address and the branch target address is shifted right a certain number of bits. If the shifted addresses are the same, then the branch target is in the same fetch group as the branch instruction. If the target is determined to be within the same instruction fetch group, then control flows to block 311. If the target is determined to not be within the same instruction fetch group, then control flows to block 313.

At block 311, the branch instruction is characterized as a small branch. For example, predecode bits are set within the instruction or within an area of the hosting instruction store that corresponds to the branch instruction. Control flows from block 311 to block 323. At block 323, the categorized instruction is stored in an instruction store, such as the instruction store 101 of FIG. 1. For example, the instruction along with the calculated predecode bits can be placed in an instruction store together.

At block 313, it is determined if the branch target location is within the next instruction fetch group. For example, it is determined if the sum of the branch instruction's address and the indicated offset falls within the range of addresses between the next instruction fetch group address and the boundary of the next instruction fetch group. If the branch target location is not within the next instruction fetch group, then control flows to block 317. If the branch target location is within the next instruction fetch group, then control flows to block 315.

At block 315, the branch instruction is characterized as a medium branch. Control flows to block 307.

At block 317, the branch instruction is characterized as a large branch. Realizations that implement additional categories may perform additional operations to further distinguish and characterize instructions.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, bits of instructions may flow through a set of logic gates which generate a mask for regulating instruction prefetching.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 4:
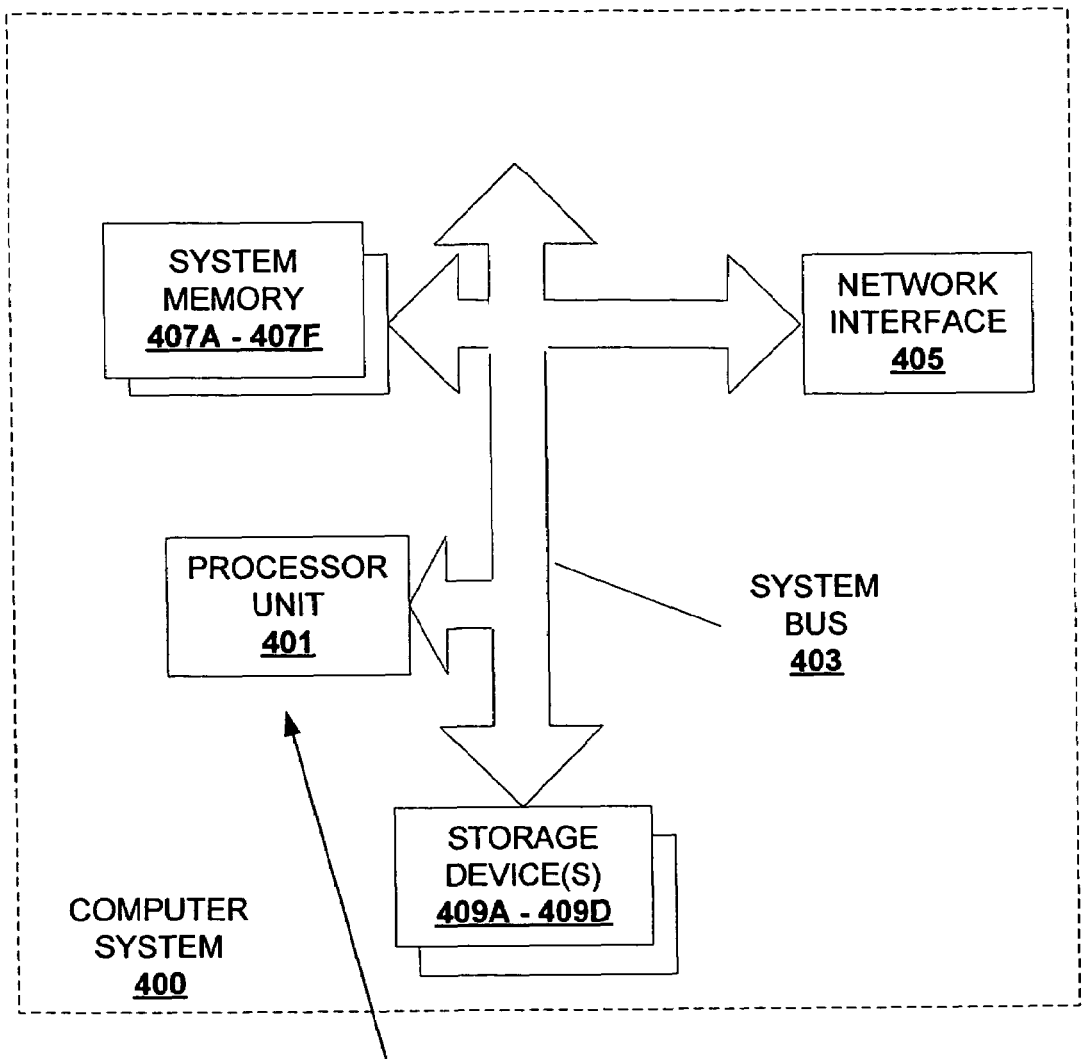
FIG. 4 depicts an exemplary computer system according to realizations of the invention.

FIG. 4 depicts an exemplary computer system according to realizations of the invention. A computer system 400 includes a processor unit 401 (possibly including multiple processors, a single threaded processor, a multi-threaded processor, a multi-core processor, etc.). The computer system 400 also includes a system memory 407A-407F (e.g., one or more of cache, SRAM DRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device (s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processor unit 401, the storage device(s) 409A-409D, the network interface 405, and the system memory 407A-407F are coupled to the system bus 403. The processor unit 401 includes an instruction store that indicates branch target location information of instructions hosted therein. The branch target location information being with respect to instruction fetch group boundaries. The processor unit 401 regulates instruction prefetching based, at least in part, on the indicated branch target location information, which characterizes branch target locations.

Figure 5:
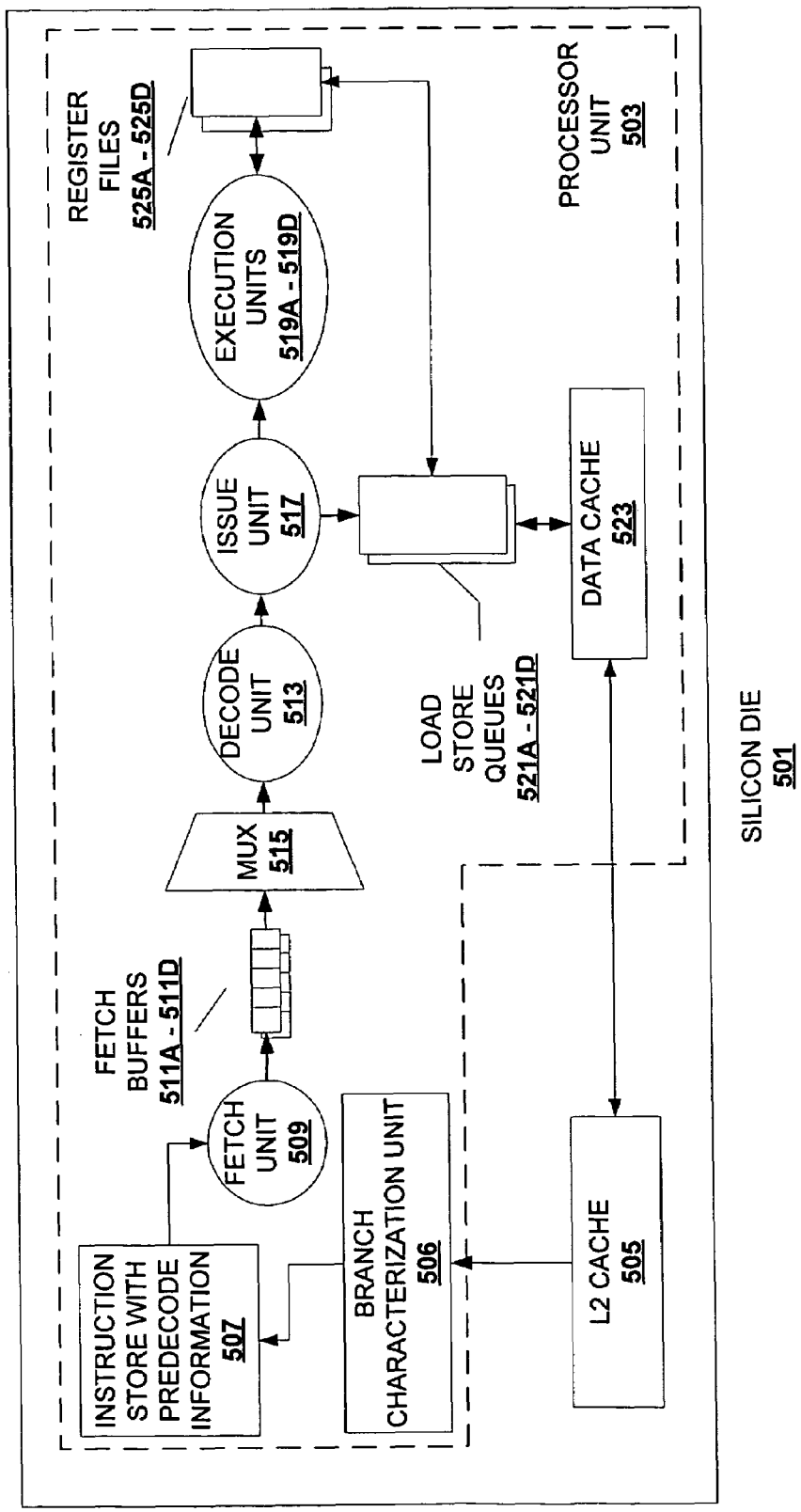
FIG. 5 depicts an exemplary silicon die with a processor unit that regulates instruction prefetching.

FIG. 5 depicts an exemplary silicon die with a processor unit that regulates instruction prefetching. A silicon die 501 includes an L2 cache 505 and a processor unit 503. The silicon die may also include a memory controller, a bus arbiter, etc. The processor unit 503 includes an instruction store 507 and a branch characterization unit 506. The branch characterization unit 506 performs operations to characterize branch operations, such as the operations illustrated in FIG. 3. The branch characterization unit 506 is coupled with the instruction store. The instruction store 507 is similar to the instruction store previously described in FIGS. 1A-1B and includes predecode information. The instruction store 507 is coupled with the branch characterization unit 506 and a fetch unit 509. The processor unit 503 also includes the fetch unit 509, fetch buffers 511A-511D, a multiplexer 515, a decode unit 513, an issue unit 517, execution units 519A-519D, register files 525A-525D, load store queues 521A-521D, and a data cache 523. The processor unit 503 may also include additional elements implemented in a processor unit but not illustrated, such as a return address stack, a translation lookahead buffer, etc. The processor unit 503 may execute multiple threads or a single thread. Individual ones of the fetch buffers 511A-511D, the load store queues 521A-521D, and the register files 525A-525D may be allocated to individual threads, multiple ones allocated to a single thread, shared by threads, utilized by a single thread, etc. In addition, a processor unit may include multiple instances of any one or all of the fetch unit 509, the decode unit 513, the issue unit 517, and the execution units 519A-519D.

In the exemplary silicon die 501, the fetch unit 509 is coupled between the instruction store 507 and the instruction buffers 511A-511D. The fetch unit 509 fetches instructions and prefetches instructions from the instruction store 507 and stores them in the fetch buffers 511A-511D. As already described, instruction prefetching by the fetch unit 509 is regulated in accordance with predecode information. A multiplexer 515 cycles through the fetch buffers 511A-511D and passes instructions to the decode unit 513. The decode unit 513 is coupled with an issue unit 517. The decode unit 513 decodes instructions and passes the decoded instructions to the issue unit 517. The issue unit 517 is coupled with the execution units 519A-519D and the load store queues 521A-521D. The issue unit 517 issues instructions to the load store queues 521A-521D or the execution units 519A-519D. The load store queues 521A-521D are coupled with a data cache 523, which is coupled with the L2 cache 505. Data for load and store instructions is retrieved from the data cache 523, the L2 cache 505, or system memory (not depicted), and then queued in the load store queues 521A-521D. The execution units 519A-519D are coupled with the register files 525A-525D. The execution units 519A-519D store values into the register files 525A-525D. The silicon die may also include a functional unit (e.g., an instruction scheduling unit) that examines instructions from memory, such as L2 cache, and generates predecode information. Such a functional unit may include an adder to add branch type instruction offsets to the branch type instruction's address to characterize the branch type instruction, shift and compare units to characterize branch type instructions, etc. In realizations, such logic for characterizing the branch type instructions, may be located coextensively with the instruction store.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:
   a fetch unit wherein said fetch unit, in sequence, fetches an instruction fetch group including at least one branch instruction and then prefetches an instruction prefetch group irrespective of a location of a branch target of said at least one branch;
   an instruction store for storing said instruction fetch group including at least one branch instruction and said instruction prefetch group wherein said instruction prefetch group sequentially follows said instruction fetch group; and
   logic to characterize a branch target of said at least one branch instruction with respect to fetch group boundaries of said instruction fetch group and said instruction prefetch group, and the processor tailoring instruction prefetching based, at least in part, on the characterizations of the branch target.

2. The processor of claim 1, wherein the logic characterizes the branch target based, at least in part, on whether the branch target resides within or beyond a fetch group boundary.

3. The processor of claim 2, wherein the fetch group boundary delimits a memory region that is contiguous with a currently fetched memory region.

4. The processor of claim 3, wherein the logic further characterizes branch targets based, at least in part, on whether the branch targets reside within the currently fetched memory region.

5. The processor of claim 1, wherein the logic characterizes branch targets at least with offsets indicated by branch instructions.

6. The processor of claim 1, wherein the instruction store hosts predecode information for the instructions, the predecode information characterizing branch target locations.

7. A processor comprising:
   an instruction store unit operable to store an instruction fetch group including at least one branch instruction and an instruction prefetch group wherein said instruction prefetch group sequentially follows said instruction fetch group;
   logic coupled with the instruction store unit, the logic operable to characterize a branch target, based upon prediction information associated with said at least one branch instruction, with respect to a fetch boundary and to regulate instruction prefetching based, at least in part, on the characterization of branch targets wherein when said prediction information includes one of not-taken, and weakly taken, the instruction prefetch group is prefetched even when the characterization of the branch target is beyond the instruction prefetch group; and
   a fetch unit coupled with the instruction store unit, the fetch unit operable, in sequence (i) to fetch instructions from the instruction store unit and then (ii) to prefetch instructions from the instruction store unit based on said characterization based upon said prediction information.

8. The processor of claim 7, wherein the logic comprises:
   a shifter operable to shift instruction addresses; and
   a compare unit operable to compare shifted addresses of instructions and shifted address of branch targets.

9. The processor of claim 7, wherein the logic includes an adder operable to add the offset of branch type instructions to the branch type instruction address.

10. The processor of claim 7 further comprising a set of one or more fetch buffers operable to host fetched instructions.

11. An apparatus comprising:
    a branch characterization unit operable to characterize branch instructions based on prediction information associated with said branch instructions wherein said prediction information includes one of taken, not-taken, and weakly taken;
    an instruction store unit coupled with the branch characterization unit, the instruction store unit operable to host instructions and their predecode information, wherein the predecode information indicates branch targets with respect to a fetch boundary; and
    a fetch unit to prefetch groups of instructions from the instruction store unit in accordance with their predecode information wherein when said prediction information includes one of not-taken, and weakly taken, a branch instruction is characterized for pre fetching even when a branch target of the branch instruction is beyond a next instruction fetch group.

12. The apparatus of claim 11, wherein the branch characterization unit is operable to generate predecode information that characterizes branch instructions.

13. The apparatus of claim 11, wherein the instruction store unit includes the branch characterization unit.

14. The apparatus of claim 11 further comprising an instruction scheduling unit operable to examine instructions and generate their predecode information.

15. The apparatus of claim 11 further comprising a decode unit.

16. A computer-processor based method comprising:
    fetching an instruction fetch group;

prefetching, in sequence following said fetching, an instruction prefetch group wherein said instruction prefetch group sequentially follows said instruction fetch group;

analyzing branch instructions in said instruction fetch group to determine branch target boundaries for instructions in said instruction fetch group; and analyzing branch prediction information for any of said branch instructions having a branch target boundary outside a boundary of said instruction fetch group and a boundary of said instruction prefetch instruction group to determine whether to continue sequential prefetching wherein when said branch prediction information includes one of not-taken, and weakly taken for a branch instruction, sequential prefetching continues even when a branch target for that branch instruction is beyond an instruction prefetch group.

* * * * *

UNITED STATES PATENT AND TRADEMARK OFFICE
CERTIFICATE OF CORRECTION

PATENT NO. : 7,647,477 B2  Page 1 of 1
APPLICATION NO. : 10/996027
DATED : January 12, 2010
INVENTOR(S) : Paul Caprioli and Shailender Chaudhry It is certified that error appears in the above-identified patent and that said Letters Patent is hereby corrected as shown below:

In Claim 8, Column 8, Line 31, replace "address" with --addresses--; and
In Claim 11, Column 8, Line 52, replace "pre fetching" with --prefetching--.

Signed and Sealed this

Twentieth Day of April, 2010

David J. Kappos
*Director of the United States Patent and Trademark Office*